(12) United States Patent
Gao et al.

(10) Patent No.: US 10,804,994 B2
(45) Date of Patent: Oct. 13, 2020

(54) ANTENNA BEAM MANAGEMENT METHOD AND RELATED DEVICE

(71) Applicant: China Academy of Telecommunications Technology, Beijing (CN)

(72) Inventors: Qiubin Gao, Beijing (CN); Runhua Chen, Beijing (CN); Tamrakar Rakesh, Beijing (CN); Xin Su, Beijing (CN); Chuanjun Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/337,961

(22) PCT Filed: Jul. 31, 2017

(86) PCT No.: PCT/CN2017/095291
§ 371 (c)(1),
(2) Date: Mar. 29, 2019

(87) PCT Pub. No.: WO2018/059112
PCT Pub. Date: Apr. 5, 2018

(65) Prior Publication Data
US 2020/0028560 A1 Jan. 23, 2020

(30) Foreign Application Priority Data

Sep. 30, 2016 (CN) .......................... 2016 1 0877296

(51) Int. Cl.
*H04B 7/06* (2006.01)
*H04B 7/0417* (2017.01)
(Continued)

(52) U.S. Cl.
CPC ......... *H04B 7/0639* (2013.01); *H04B 7/0417* (2013.01); *H04B 7/0695* (2013.01);
(Continued)

(58) Field of Classification Search
CPC .. H04B 7/0639; H04B 7/0417; H04B 7/0695; H04B 7/088; H04B 7/06; H04B 7/0413;
(Continued)

(56) References Cited

U.S. PATENT DOCUMENTS

| | | | |
|---|---|---|---|
| 2013/0040684 A1* | 2/2013 | Yu | H04B 7/0617 455/517 |
| 2013/0072243 A1* | 3/2013 | Yu | H04B 7/0695 455/509 |

(Continued)

FOREIGN PATENT DOCUMENTS

| | | |
|---|---|---|
| CN | 101296011 A | 10/2008 |
| CN | 101582747 A | 11/2009 |

(Continued)

OTHER PUBLICATIONS

3GPP TSG-RAN WG1 Meeting #86, RI-166219, 'Discussion on NR beamforming with UE-group-specific beam sweeping', Gothenburg, Sweden, Aug. 22-26, 2016.

*Primary Examiner* — Jean B Corrielus
(74) *Attorney, Agent, or Firm* — Kilpatrick Townsend & Stockton, LLP

(57) ABSTRACT

Disclosed in the present application are an antenna beam management method and related device, used for solving the problem in current large-scale antenna technology wherein the overhead of beam management control signaling is large. The method is: a terminal sending related information of a downlink beam of the terminal to a base station so that the base station determines a first downlink sending beam on the basis of the related information of the downlink beam; the (Continued)

terminal receiving notification information related to the first downlink sending beam send by the base station, the notification information comprising indication information that is used by the terminal to determine at least one first downlink receiving beam; the terminal determining the at least one first downlink receiving beam on the basis of the notification information; and the terminal receiving a downlink signal on the basis of the at least one first downlink receiving beam.

14 Claims, 4 Drawing Sheets

(51) Int. Cl.
*H04B 7/08* (2006.01)
*H04W 16/28* (2009.01)
*H04W 72/04* (2009.01)

(52) U.S. Cl.
CPC ............ *H04B 7/088* (2013.01); *H04W 16/28* (2013.01); *H04W 72/046* (2013.01)

(58) Field of Classification Search
CPC .. H04W 16/28; H04W 72/046; H04W 72/044
See application file for complete search history.

(56) References Cited

U.S. PATENT DOCUMENTS

| | | | |
|---|---|---|---|
| 2015/0351135 A1 | 12/2015 | Schmidt et al. | |
| 2016/0157218 A1* | 6/2016 | Nam | H04B 7/0456 370/329 |
| 2017/0012692 A1* | 1/2017 | Kim | H04B 7/0695 |
| 2017/0318615 A1* | 11/2017 | Ou | H04B 7/026 |
| 2018/0212659 A1* | 7/2018 | Xiong | H04B 7/0695 |
| 2019/0199412 A1* | 6/2019 | Koskela | H04B 7/063 |

FOREIGN PATENT DOCUMENTS

| | | |
|---|---|---|
| CN | 103918196 A | 7/2014 |
| CN | 104734759 A | 8/2015 |
| JP | 2014526837 A | 10/2014 |
| KR | 20130030225 A | 3/2013 |
| KR | 20150105710 A | 9/2015 |
| WO | 2011055535 A1 | 5/2011 |
| WO | 2015117651 A1 | 8/2015 |

* cited by examiner

ANTENNA BEAM MANAGEMENT METHOD AND RELATED DEVICE

CROSS-REFERENCES TO RELATED APPLICATIONS

This application is a US National Stage of International Application No. PCT/CN2017/095291, filed Jul. 31, 2017, which claims priority to Chinese Patent Application No. 201610877296.4, filed with the Chinese Patent Office on Sep. 30, 2016, and entitled "Method and device for managing an antenna beam", which is hereby incorporated by reference in its entirety.

FIELD

The present invention relates to the field of communications, and particularly to a method and device for managing an antenna beam.

BACKGROUND

1. An introduction to the Multiple-Input Multiple-Output (MIMO) technologies is as follows.

Since the MIMO technologies are of significance to an improvement of a peak rate, and an utilization ratio of system spectrums, various radio access technology standards of Long Term Evolution (LTE), LTE-Advanced (LTE-A), etc., are built based upon the MIMO technologies and the Orthogonal Frequency Division Multiplexing (OFDM) technologies. A performance gain of the MIMO technologies comes from the spatial freedom available in a multi-antenna system, so the most important evolvement of the MIMO technologies being standardized is the extension of the dimensionality thereof.

At most four layers of MIMO transmission can be supported in the LTE Rel-8. The Multi-User MIMO (MU-MIMO) technology is enhanced in the Rel-9 so that at most four downlink data layers can be supported in MU-MIMO transmission in the Transmission Mode (TM) 8. 8-antenna ports are introduced to the Rel-10 to thereby further improve the spatial resolution of channel state information, and a transmission capacity of Single-User MIMI (SU-MIMO) is further extended to at most eight data layers. The Full-Dimension MIMO (FD-MIMO) is introduced to the Rel-13 and the Rel-14 to enable full-dimension and vertical beam-forming.

2. An introduction to the massive antenna technology is as follows.

In order to further improve the MIMO technologies, the massive antenna technology is introduced to a mobile communication system. For a base station, a massive array of all-digital antennas can include up to 128/256/512 antenna elements, and up to 128/256/512 transceivers, where each antenna element is connected with one of the transceivers. Pilots of up to 128/256/512 antenna ports are transmitted so that a UE measures and feeds back channel state information. For the UE, it can also be configured with an array of antennas including up to 32/64 antenna elements. With beam-forming at both the base station side and the UE side, there is a significant gain of beam-forming to compensate for signal attenuation arising from a path loss. There is an extremely limited coverage area of a radio signal due to a path loss, particularly in communication in a high frequency band, e.g., at the frequency 30 GHz. With the massive antenna technology, the coverage area of a radio signal can be extended to a practical area.

The massive antenna technology in the prior art generally operates with a solution to the architecture of a transmitter and a receiver with hybrid digital and analog beam-forming as illustrated in FIG. 1. Both analog beam-forming and hybrid digital and analog beam-forming necessitates an adjustment to analog beam-forming weights of the transmitter and the receiver so that a resulting beam can be oriented to the opposite communication end. For downlink transmission, beam-forming weights for transmission at the base station side, and beam-forming weights for reception at the UE side shall be adjusted. Beam-forming weights are typically obtained by transmitting a training signal. In the downlink direction, the base station transmits downlink beam training signals, and the UE measures the downlink beam training signals, selects optimum base station transmission beams, and feeds beam related information back to the base station; and the UE also selects corresponding optimum reception beams, and stores it locally. In the uplink direction, the UE transmits uplink beam training signals, and the base station measures the uplink beam training signals, selects optimum UE transmission beams, and passes beam related information to the UE; and the base station also selects corresponding optimum reception beams, and stores it locally. Data can be transmitted after the uplink and downlink transmission and beam training is finished.

Before data are transmitted, in order to enable the receiver to set the reception beam reasonably, the transmitter shall pass transmission beam related information to the receiver. For downlink transmission, the array of antennas in the transmitter (the base station) typically has a larger scale, and thus there are a larger number of beams, so there will be a considerable overhead of control signaling for passing the transmission beam related information.

Accordingly it is highly desirable in the existing massive antenna technology to address the problem of how to lower an overhead of control signaling for beam management.

SUMMARY

Embodiments of the invention provide a method and device for managing an antenna beam so as to address the problem of a considerable overhead of control signaling for beam management in the existing massive antenna technology.

Specific technical solutions according to the embodiments of the invention are as follows.

In a first aspect, an embodiment of the invention provides a method for managing an antenna beam, the method including:

transmitting, by a UE, downlink beam related information of the UE to a base station, so that the base station determines at least one first downlink transmission beam based upon the downlink beam related information;

receiving, by the UE, a notification related to the first downlink transmission beam, transmitted by the base station, wherein the notification includes an indicator for the UE to determine at least one first downlink reception beam;

determining, by the UE, the at least one first downlink reception beam based upon the notification; and receiving, by the UE, a downlink signal using the at least one first downlink reception beam.

Optionally transmitting, by the UE, the downlink beam related information of the UE to the base station includes:

receiving, by the UE, K number of downlink transmission beam training signals transmitted by the base station using at least one of M number of downlink reception beams;

determining, by the UE, the downlink beam related information of the UE based upon reception signals received using the at least one downlink reception beam; and transmitting, by the UE, the downlink beam related information to the base station;

wherein M and K are integers more than or equal to 1, and K is more than or equal to M.

Optionally the downlink beam related information is:

N number of first identifiers of N number of downlink transmission beams satisfying a preset condition among K number of downlink transmission beams of the base station, and reception information corresponding to each of the N number of downlink transmission beams, wherein N is an integer more than or equal to 1, and less than or equal to K.

Optionally the reception information is:

an identifier of a downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

Optionally determining, by the UE, the at least one first downlink reception beam based upon the notification includes:

determining the at least one downlink reception beams based upon the at least one index; or determining the at least one first downlink reception beam based upon the first reception indicator; or determining the at least one first downlink reception beam based upon the at least one identifier, and a correspondence relationship between identifiers and downlink reception beams; or determining at least one second downlink reception beam based upon the at least one index or the at least one identifier; and determining at least one reception beam matching with the at least one second downlink reception beam among the M number of downlink reception beams as the at least one first downlink reception beam; or determining at least one target group based upon the at least one group identifier, and selecting a first downlink reception beam from each of the at least one target group as the at least one first downlink reception beam.

Optionally selecting a first downlink reception beam from each of the at least one target group includes:

selecting, by the UE, any one downlink reception beam from each group as the first downlink reception beam; or selecting, by the UE, a downlink reception beam matching with a second group information from each group as the first downlink reception beam; or receiving, by the UE, R number of training signals transmitted by the base station using each downlink reception beam in each group, and selecting, by the UE, a downlink reception beam satisfying a preset rule from each group as the first downlink reception beam based upon reception training signals received using each downlink reception beam.

In a second aspect, an embodiment of the invention provides a method for managing an antenna beam, the method including:

receiving, by a base station, downlink beam related information transmitted by a UE;

determining, by the base station, at least one first downlink transmission beam based upon the downlink beam related information;

transmitting, by the base station, a notification related to the first downlink transmission beam to the UE, so that the UE determines at least one first downlink reception beam based upon the notification, wherein the notification includes an indicator for the UE to determine the at least one first downlink reception beam; and transmitting, by the base station, a downlink signal to the UE using the first downlink transmission beam.

Optionally before the base station receives the downlink beam related information transmitted by the UE, the method further includes:

transmitting, by the base station, K number of downlink transmission beam training signals to the UE, wherein K is an integer more than or equal to 1.

Optionally the downlink beam related information is:

N number of first identifiers of N number of downlink transmission beams satisfying a preset condition among K number of downlink transmission beams of the base station, and reception information corresponding to each of the N number of downlink transmission beams, wherein N is an integer more than or equal to 1, and less than or equal to K.

Optionally the reception information is:

an identifier of a downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally transmitting, by the base station, the notification related to the first downlink transmission beam to the UE includes:

deciding, by the base station, whether to transmit the notification to the UE; and if the base station decides to transmit the notification to the UE, then transmitting the notification to the UE.

Optionally deciding, by the base station, whether to transmit the notification to the UE includes:

determining, by the base station, whether a current downlink transmission beam is the same as the first downlink transmission beam; and if the current downlink transmission beam is determined not to be the same as the first downlink transmission beam, then deciding to transmit the notification to the UE.

Optionally the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

In a third aspect, an embodiment of the invention provides a UE including:

a first transmitting module configured to transmit downlink beam related information of the UE to a base station, so that the base station determines at least one first downlink transmission beam based upon the downlink beam related information;

a first receiving module configured to receive a notification related to the first downlink transmission beam, transmitted by the base station, wherein the notification includes an indicator for the UE to determine at least one first downlink reception beam;

a first determining module configured to determine the at least one first downlink reception beam based upon the notification; and a first communicating module configured to receive a downlink signal using the at least one first downlink reception beam.

Optionally the first transmitting module is configured:

to receive K number of downlink transmission beam training signals transmitted by the base station using at least one of M number of downlink reception beams;

to determine the downlink beam related information of the UE based upon the reception signals received using the at least one downlink reception beam; and to transmit the downlink beam related information to the base station;

wherein M and K are integers more than or equal to 1, and K is more than or equal to M.

Optionally the downlink beam related information is:

N number of first identifiers of the N number of downlink transmission beams satisfying a preset condition among K number of downlink transmission beams of the base station, and reception information corresponding to each of the N number of downlink transmission beams, wherein N is an integer more than or equal to 1, and less than or equal to K.

Optionally the reception information is:

an identifier of a downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

Optionally the first determining module is configured:

to determine the at least one downlink reception beams based upon the at least one index; or to determine the at least one first downlink reception beam based upon the first reception indicator; or to determine the at least one first downlink reception beam based upon the at least one identifier, and a correspondence relationship between identifiers and downlink reception beams; or to determine at least one second downlink reception beam based upon the at least one index or the at least one identifier; and to determine at least one reception beam matching with the at least one second downlink reception beam among the M number of downlink reception beams as the at least one first downlink reception beam; or to determine at least one target group based upon the at least one group identifier, and to select a first downlink reception beam from each of the at least one target group as the at least one first downlink reception beam.

Optionally the first determining module is configured:

to select any one downlink reception beam from each group as the first downlink reception beam; or to select a downlink reception beam matching with a second group information from each group as the first downlink reception beam; or to receive R number of training signals transmitted by the base station using each downlink reception beam in each group, and to select a downlink reception beam satisfying a preset rule from each group as the first downlink reception beam based upon reception training signals received using each downlink reception beam.

In a fourth aspect, an embodiment of the invention provides a base station including:

a second receiving module configured to receive downlink beam related information transmitted by a UE;

a second determining module configured to determine at least one first downlink transmission beam based upon the downlink beam related information;

a second transmitting module configured to transmit a notification related to the first downlink transmission beam to the UE, so that the UE determines at least one first downlink reception beam based upon the notification, wherein the notification includes an indicator for the UE to determine the at least one first downlink reception beam; and a second communicating module configured to transmit a downlink signal to the UE using the first downlink transmission beam.

Optionally the base station further includes:

a third transmitting module configured to transmit K number of downlink transmission beam training signals to the UE, wherein K is an integer more than or equal to 1.

Optionally the downlink beam related information is:

N number of first identifiers of N number of downlink transmission beams satisfying a preset condition among K number of downlink transmission beams of the base station, and reception information corresponding to each of the N number of downlink transmission beams, wherein N is an integer more than or equal to 1, and less than or equal to K.

Optionally the reception information is:

an identifier of a downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the second transmitting module is configured:
to decide whether to transmit the notification to the UE; and
if it is decided to transmit the notification to the UE, to transmit the notification to the UE.

Optionally the second transmitting module is configured:
to determine whether a current downlink transmission beam is the same as the first downlink transmission beam; and
if the current downlink transmission beam is determined not to be the same as the first downlink transmission beam, to decide to transmit the notification to the UE.

Optionally the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

In a fifth aspect, an embodiment of the invention provides a UE including a processor, a memory, and a transceiver, wherein the transceiver receives and transmits data under the control of the processor, the memory stores preset program, and the processor reads and executes the program in the memory:

to transmit downlink beam related information of the UE to a base station through the transceiver, so that the base station determines at least one first downlink transmission beam based upon the downlink beam related information;

to receive a notification related to the first downlink transmission beam, transmitted by the base station through the transceiver, wherein the notification includes an indicator for the UE to determine at least one first downlink reception beam;

to determine the at least one first downlink reception beam based upon the notification; and to receive a downlink signal using the at least one first downlink reception beam through the transceiver.

Optionally the processor is configured: to receive K number of downlink transmission beam training signals transmitted by the base station using at least one of M number of downlink reception beams through the transceiver; to determine the downlink beam related information of the UE based upon the reception signals received using the at least one downlink reception beam; and to transmit the downlink beam related information to the base station through the transceiver, wherein M and K are integers more than or equal to 1, and K is more than or equal to M.

Optionally the downlink beam related information is:
N number of first identifiers of N number of downlink transmission beams satisfying a preset condition among K number of downlink transmission beams of the base station, and reception information corresponding to each of the N number of downlink transmission beams, wherein N is an integer more than or equal to 1, and less than or equal to K.

Optionally the reception information is:
an identifier of a downlink reception beam corresponding to each downlink transmission beam; or
information of a downlink reception beam group corresponding to each downlink transmission beam; or
a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

Optionally the processor is configured:
to determine the at least one downlink reception beam based upon the at least one index; or
to determine the at least one first downlink reception beam based upon the first reception indicator; or
to determine the at least one first downlink reception beam based upon the at least one identifier, and a correspondence relationship between identifiers and downlink reception beams; or
to determine at least one second downlink reception beam based upon the at least one index or the at least one identifier; and to determine at least one reception beam matching with the at least one second downlink reception beam among the M number of downlink reception beams as the at least one first downlink reception beam; or
to determine at least one target group based upon the at least one group identifier, and to select a first downlink reception beam from each of the at least one target group as the at least one first downlink reception beam.

Optionally the processor is configured: to select any one downlink reception beam from each group as the first downlink reception beam; or
to select a downlink reception beam matching with a second group information from each group as the first downlink reception beam; or
to receive R training signals transmitted by the base station using each downlink reception beam in each group, and to select a downlink reception beam satisfying a preset rule from each group as the first downlink reception beam based upon reception training signals received using each downlink reception beam.

In a sixth aspect, an embodiment of the invention provides a base station including a processor, a memory, and a transceiver, wherein the transceiver receives and transmits data under the control of the processor, the memory stores preset program, and the processor reads and executes the program in the memory:

to receive downlink beam related information transmitted by a UE through the transceiver;

to determine at least one first downlink transmission beam based upon the downlink beam related information;

to transmit a notification related to the first downlink transmission beam to the UE through the transceiver, so that the UE determines at least one first downlink reception beam based upon the notification, wherein the notification includes an indicator for the UE to determine the at least one first downlink reception beam; and to transmit a downlink signal to the UE using the first downlink transmission beam through the transceiver.

Optionally before the processor receives the downlink beam related information transmitted by the UE through the transceiver, the processor is further configured to transmit K number of downlink transmission beam training signals to the UE, wherein K is an integer more than or equal to 1.

Optionally the downlink beam related information is:
N number of first identifiers of N number of downlink transmission beams satisfying a preset condition among K number of downlink transmission beams of the base station, and reception information corresponding to each of the N number of downlink transmission beams, wherein N is an integer more than or equal to 1, and less than or equal to K.

Optionally the reception information is:

an identifier of a downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the processor is configured: to decide whether to transmit the notification to the UE; and if it is decided to transmit the notification to the UE, to transmit the notification to the UE through the transceiver.

Optionally the processor is configured: to determine whether a current downlink transmission beam is the same as the first downlink transmission beam; and if the current downlink transmission beam is determined not to be the same as the first downlink transmission beam, to decide to transmit the notification to the UE.

Optionally the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

With the technical solutions above, in the embodiments of the invention, the UE transmits the downlink beam related information of the UE to the base station, so that the base station determines at least one first downlink transmission beam based upon the downlink beam related information; the UE receives the notification related to the first downlink transmission beam, transmitted by the base station, where the notification includes the indicator for the UE to determine at least one first downlink reception beam; the UE determines the at least one first downlink reception beam based upon the notification; and the UE receives a downlink signal using the at least one first downlink reception beam, so that the beams are managed and controlled based upon the reception beams of the UE, and the number of reception beams of the UE is less than the number of transmission beams of the base station, so the amount of downlink beam related information transferred between the UE and the base station can also be reduced, to thereby greatly lower an overhead of control signaling, so as to address the problem of a considerable overhead of control signaling for managing beams in the existing massive antenna technology.

DETAILED DESCRIPTION OF THE INVENTION

In order to make the objects, technical solutions, and advantages of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

First Embodiment

Figure 1:
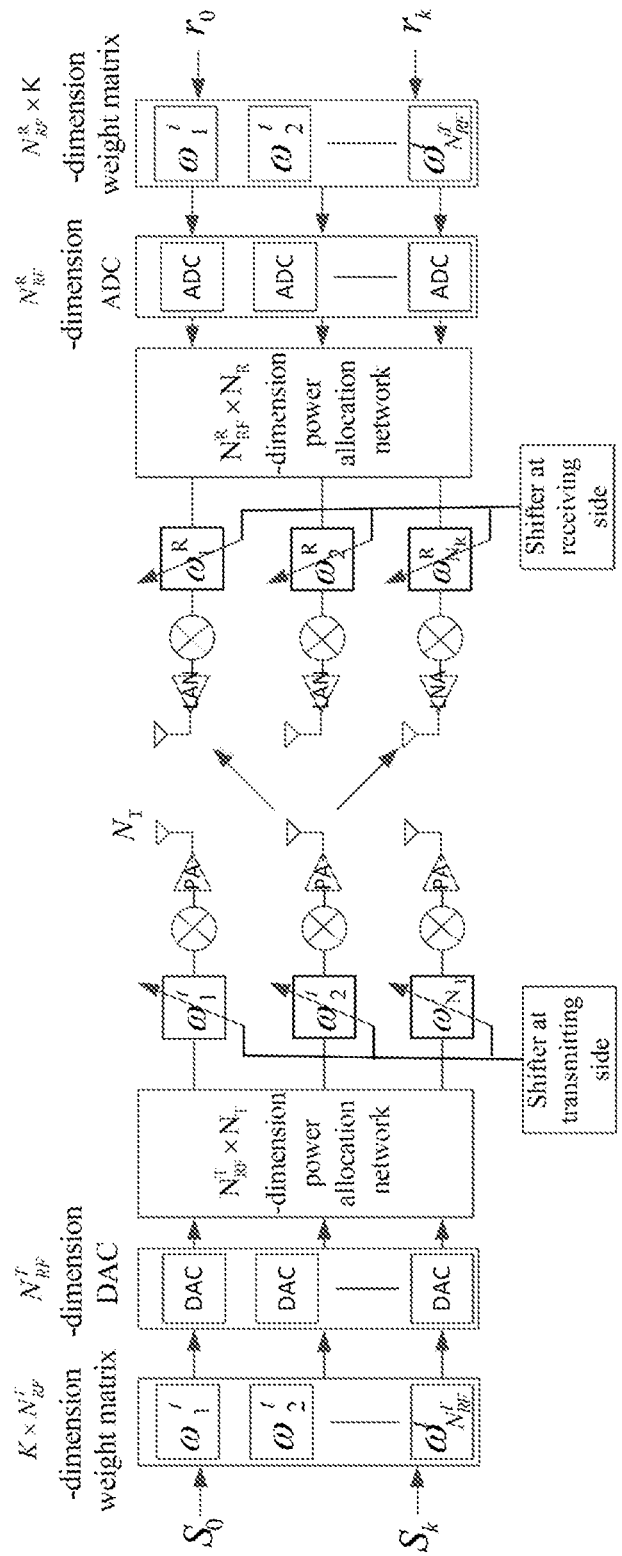
FIG. 1 is a schematic diagram of the architecture of a transmitter and a receiver with hybrid digital and analog beam-forming in the prior art.
Figure 2:
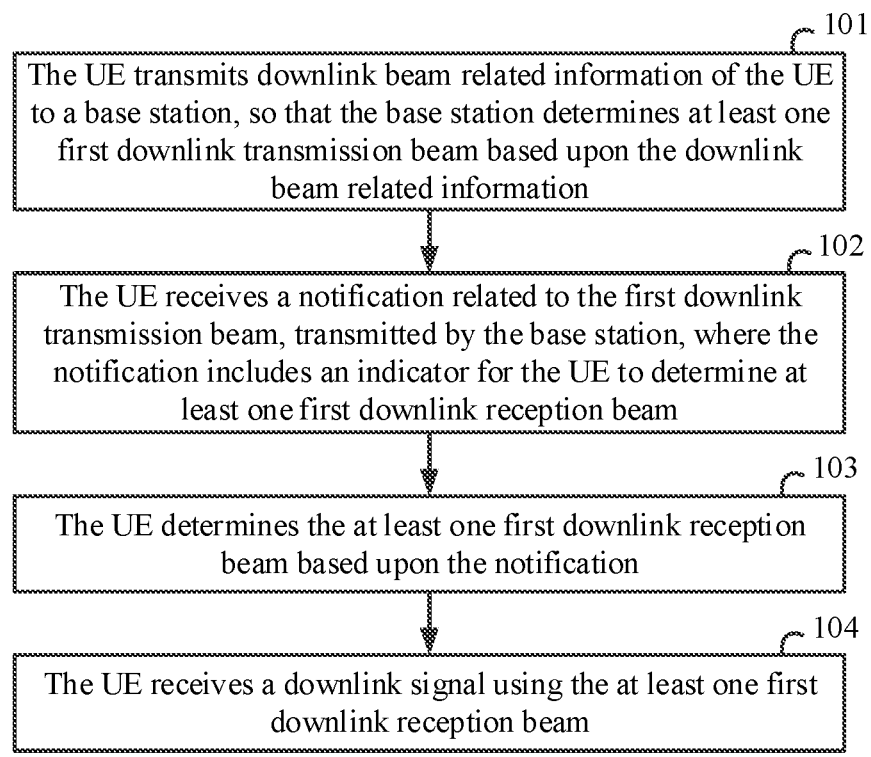
FIG. 2 is a schematic flow chart of managing a beam by a UE according to an embodiment of the invention.

As illustrated in FIG. 2, a UE manages a beam according to an embodiment of the invention specifically as follows.

In the step 101, the UE transmits downlink beam related information of the UE to a base station, so that the base station determines at least one first downlink transmission beam based upon the downlink beam related information.

In the embodiment of the invention, a specific implementation of the step 101 is as follows.

The UE receives K number of downlink transmission beam training signals transmitted by the base station using at least one of M number of downlink reception beams.

The UE determines the downlink beam related information of the UE based upon the reception signals received using the at least one downlink reception beam.

The UE transmits the downlink beam related information to the base station.

Here M and K are integers more than or equal to 1, and K is more than or equal to M.

Specifically the UE firstly reports the number M of reception beams thereof to the base station. The UE has M reception beams in total, where each reception beam corresponds to a set of beam-forming weights, and for example, reception beam-forming weights of the n-th beam is $V_n = [v_1^n \, v_2^n \ldots v_L^n]^T$, where L is the number of antenna elements of beam-forming, and can be less than the number of antenna elements of the UE, and each reception beam corresponds to a direction in space.

After the base station receives the number of reception beams reported by the UE, the UE receives the downlink beam training signals transmitted by the base station. The base station has K candidate downlink transmission beams in total, where each downlink beam corresponds to a set of beam-forming weights, and for example, transmission beam-forming weights of the n-th beam is $W_n = [w_1^n \, w_2^n \ldots w_K^n]^T$, where k is the number of antenna elements of beam-forming, and can be less than the number of antenna elements of the base station.

The base station can transmit one beam training signal for each candidate downlink transmission beam, where the beam training signal of each beam is transmitted after being beam-formed using beam-forming weights corresponding to the beam. For example, for K number of downlink transmission beams, the base station can transmit K training signals, where these K training signals can be applied in a Time Division Multiplexing (TDM) mode, a Frequency Division Multiplexing (FDM) mode, a Code Division Multiplexing (CDM) mode, or in a combination thereof. For example, in an OFDM-based system, the K training signals can occupy K OFDM symbols, where each training signal occupies one of the OFDM symbols, and the training signals are applied in the TDM mode; or a plurality of beam training signals can be transmitted in an OFDM symbol, where they are applied in the FDM or CDM mode. The beam training signals can be transmitted periodically or can be transmitted aperiodically, although the embodiment of the invention will not be limited thereto.

The UE can receive the downlink beam training signals transmitted by the base station using one or more of the M reception beams, and then measure the received beam training signals, and further determine N number of downlink transmission beams satisfying a condition. Specifically the condition can be that power of the received beam training signal is the highest, or power of the received beam training signal is above a preset threshold, where the preset threshold can be agreed on between the base station and the UE, and for example, prescribed on in a protocol, or can be configured by the base station for the UE via signaling. Of course, the condition can alternatively be a condition related to a signal to interference plus noise ratio, a signal to noise ratio, or another parameter of the received beam training signal, although the embodiment of the invention will not be limited thereto. Of course, the condition can alternatively relate to all the downlink transmission beams corresponding to the base station, and at this time, N is equal to K, that is, the N number of downlink transmission beams are all the downlink transmission beams of the base station.

After the UE determines the N number of downlink transmission beams, the UE needs to determine a reception beam corresponding to each of the N number of downlink transmission beams. Specifically for a downlink beam training signal, the UE can attempt on receiving it respectively using each reception beam, and select the reception beam with the highest power of the received signal as a reception beam of the downlink transmission beam. Of course, the UE can select an optimum reception beam according to a signal to interference plus noise ratio, a signal to noise ratio, or another parameter of the received signal, although the embodiment of the invention will not be limited thereto.

After the UE determines the N number of downlink transmission beams, and their corresponding reception beams, the UE feeds the N number of downlink transmission beams, and their corresponding reception information back to the base station.

In the embodiment of the invention, specifically the downlink beam related information is: N first identifiers of the N number of downlink transmission beams satisfying the preset condition among the K number of downlink transmission beams of the base station, and reception information corresponding to each of the N number of downlink transmission beams, where N is an integer more than or equal to 1, and less than or equal to K.

In the embodiment of the invention, specifically the reception information is: the identifier of the downlink reception beam corresponding to each downlink transmission beam; or a reception indicator corresponding to each downlink transmission beam.

Specifically the UE can transmit the identifiers of the N number of downlink transmission beams, and the identifier of the reception beam corresponding to each downlink transmission beam to the base station; or can transmit the identifiers of the N number of downlink transmission beams, and the reception indicator corresponding to each downlink transmission beam to the base station. The identifiers of the N number of downlink transmission beams can be their indexes, or different information can be fed back according to a different multiplexing mode of the downlink transmission beams or the downlink transmission beam training signals; and for example, the downlink beam-forming signals are applied in different OFDM symbols or sub-frames in the time division multiplexing mode, and the UE measures and feeds back downlink time information (e.g., OFDM symbol or sub-frame indexes) of the determined N number of downlink transmission beams. In another example, the downlink beam-forming signals are applied over different frequency resources (PRBs or sub-bands) in the frequency division multiplexing mode, and the UE measures and feeds back downlink frequency information (e.g., PRB or sub-band indexes) of the determined N number of downlink transmission beams. The reception information can further include the strengths, e.g., received signal power levels, etc., of the downlink transmission beam training signals received by the UE. The identifiers of the reception beams range from 0 to M.

For example, the UE reports a correspondence relationship between three downlink transmission beams x0, x1, and x2, and their corresponding reception beams y0, y1, and y2 as depicted in Table 3 to the base station.

TABLE 1

| Identifier of downlink transmission beam | Identifier of downlink reception beam |
| --- | --- |
| $X_0$ | $Y_0$ |
| $X_1$ | $Y_1$ |
| $X_2$ | $Y_2$ |

Alternatively the UE reports the identifier of the reception beam corresponding to each downlink transmission beam as depicted in Table 2 to the base station. Each downlink transmission beam as described here refers to any one of the N number of downlink transmission beams, and the same will apply hereinafter.

TABLE 2

| Identifier of downlink transmission beam | Identifier of downlink reception beam |
| --- | --- |
| $X_0$ | $Y_0$ |
| $X_1$ | $Y_1$ |
| $X_2$ | $Y_2$ |
| ... | ... |
| $X_K$ | $Y_M$ |

Furthermore the UE stores a mapping relationship between a downlink reception beam corresponding to each reported downlink transmission beam, and a downlink reception beam identifier of the downlink reception beam identifier.

Alternatively the UE reports the identifiers of downlink transmission beams with received signal power above some threshold, and the identifiers of their corresponding reception beams as depicted in Table 3 to the base station.

TABLE 3

| Identifier of downlink transmission beam | Identifier of downlink reception beam |
|---|---|
| $X_0$ | $Y_0$ |
| $X_1$ | $Y_1$ |
| $X_4$ | $Y_4$ |
| $X_7$ | $Y_7$ |
| $X_9$ | $Y_9$ |

Alternatively the UE determines the reception indicator of each downlink transmission beam according to the downlink reception beam corresponding to each downlink transmission beam, and the UE reports the reception indicator corresponding to each downlink transmission beam as depicted in Table 4 to the base station.

TABLE 4

| Identifier of downlink transmission beam | Reception indicator |
|---|---|
| $X_0$ | $Z_0$ |
| $X_1$ | $Z_1$ |
| $X_2$ | $Z_2$ |
| ... | ... |
| $X_K$ | $Z_M$ |

There is a mapping relationship between downlink reception beams and reception indicators, and the UE stores the mapping relationship between downlink reception beams and reception indicators.

After the step above is performed, the flow of the method according to the embodiment of the invention proceeds to the step 102 in which the UE receives a notification, related to the first downlink transmission beam, transmitted by the base station, where the notification includes an indicator for the UE to determine at least one first downlink reception beam.

Specifically after the UE reports the information to the base station, the base station determines the downlink transmission beam for transmitting a downlink signal to the UE, according to the information reported by the UE, and transmits the notification including the indicator for determining the corresponding reception beam to the base station.

In the embodiment of the invention, the indicator is at least one index of the at least one first downlink reception beam, or at least one identifier of the at least one first downlink reception beam, or a first reception indicator corresponding to the first downlink transmission beam.

In the embodiment of the invention, the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

Specifically the validity time of the notification refers to the time when the notification is received+an interval of time (the interval of time may be 0, that is, the notification is validated immediately upon reception thereof), where the interval of time is fixed, or information about the interval of time is carried in the notification; or a beam switching notification can further include an indicator of a valid time-frequency resource, i.e., indicating a time-frequency resource position to which the UE applies a target beam, e.g., indicating those sub-frames (PRBs/sub-bands) in which the UE receives using the target reception beam.

Since there may be a plurality of reception beams, the UE needs to apply the plurality of reception beams to different time-frequency resources under some rule. For example, T beams are used in T sub-frames (or OFDM symbols or other time units), data are received in each sub-frame using one of the beams, and the beams are cycled at a periodicity of T sub-frames. Alternatively data can be received over different frequency resources in a sub-frame using different beams. Correspondingly the beam switching notification transmitted by the base station can further include a mapping relationship between beams and time-frequency resources in a period of time, i.e., a beam pattern.

After the step above is performed, the flow of the method according to the embodiment of the invention proceeds to the step 103 in which the UE determines the at least one first downlink reception beam based upon the notification.

In the embodiment of the invention, a specific implementation of the step 103 is as follows: the UE determines the at least one first downlink reception beam based upon the at least one index; or the UE determines the at least one first downlink reception beam based upon the first reception indicator; or the UE determines the at least one first downlink reception beam based upon the at least one identifier, and the correspondence relationship between identifiers and downlink reception beams; or the UE determines at least one second downlink reception beam based upon the at least one index or the at least one identifier, and determines at least one reception beam matching with the at least one second downlink reception beam among the M number of downlink reception beams as the at least one first downlink reception beam.

Specifically after the notification is validated, the UE can determine the corresponding reception beam directly according to the index in the notification; or can determine the beam corresponding to the identifier in the notification as the first reception beam according to the identifier and the correspondence relationship between identifiers and reception beams stored in the UE; or can firstly determine the corresponding downlink reception beam according to the index or the identifier, and then search "nearby" the downlink reception beam for a more optimum reception beam used as the first reception beam, where it can be determined that a beam is "nearby" another beam, according to their correlation, e.g., beams with their beam-forming weight correlation being above some threshold, or it can be determined that a beam is "nearby" another beam, according to their difference in angle in space, e.g., beams with their difference in angle in space being below some threshold; or can determine the downlink reception beam corresponding to the first reception indicator as the first downlink reception beam based upon the reception indicator, and the mapping relationship between reception indicators and reception beams stored in the UE.

After the step above is performed, the flow of the method according to the embodiment of the invention proceeds to the step 104 in which the UE receives a downlink signal using the at least one first downlink reception beam.

Specifically after the UE and the base station determine the downlink transmission beam and the downlink reception beam, a downlink signal can be transmitted.

Second Embodiment

As illustrated in FIG. 2, a UE manages a beam according to an embodiment of the invention specifically as follows.

In the step 101, the UE transmits downlink beam related information of the UE to a base station, so that the base station determines a first downlink transmission beam based upon the downlink beam related information.

In the embodiment of the invention, a specific implementation of the step 101 is as follows.

The UE receives K number of downlink transmission beam training signals transmitted by the base station using at least one of M number of downlink reception beams.

The UE determines the downlink beam related information of the UE based upon the signals received using the at least one downlink reception beam.

The UE transmits the downlink beam related information to the base station.

Here M and K are integers more than or equal to 1, and K is more than or equal to M.

Specifically the UE firstly groups its M reception beams, and for example, the M reception beams are grouped according to their correlation, where beams with their correlation being above some threshold are grouped together; or the M reception beams are grouped according to their directivities in space, where beams with their directivities in space lying in some range are grouped together; and then the UE reports the number of its groups of reception beams to the base station.

After the base station receives the number of groups of reception beams reported by the UE, the UE receives the downlink beam training signals transmitted by the base station, where the downlink transmission beam training signals are transmitted in the same way, and their related parameters are the same, as described in the first embodiment, so a repeated description thereof will be omitted here.

The UE can receive the downlink beam training signals transmitted by the base station using one or more of the plurality of groups of reception beams, and then measure the received beam training signals, and further determine N number of downlink transmission beams satisfying a condition. Specifically the condition can be that power of the beam training signal received using a group of beams is the highest, or power of the beam training signal received using a group of beams is above a preset threshold, where the preset threshold can be agreed on between the base station and the UE, and for example, prescribed in a protocol, or can be configured by the base station for the UE via signaling. Of course, the condition can alternatively be a condition related to a signal to interference plus noise ratio, a signal to noise ratio, or another parameter of the beam training signal received using a group of beams, although the embodiment of the invention will not be limited thereto. Of course, the condition can alternatively relate to all the downlink transmission beams corresponding to the base station, and at this time, N is equal to K, that is, the N number of downlink transmission beams are all the downlink transmission beams of the base station.

After the UE determines the N number of downlink transmission beams, the UE needs to determine a reception beam group corresponding to each of the N number of downlink transmission beams. Specifically for a downlink beam training signal, the UE can attempt on receiving it respectively using each reception beam group, and select the reception beam group with the highest power of the received signal as a reception beam group corresponding to the downlink transmission beam. Of course, the UE can select an optimum reception beam group according to a signal to interference plus noise ratio, a signal to noise ratio, or another parameter of the received signal, although the embodiment of the invention will not be limited thereto.

After the UE determines the N number of downlink transmission beams and their corresponding reception beam group, the UE feeds the N number of downlink transmission beams, and information about their corresponding reception beam group back to the base station.

In the embodiment of the invention, specifically the downlink beam related information is: N first identifiers of the N number of downlink transmission beams satisfying a preset condition among K number of downlink transmission beams of the base station, and reception information corresponding to each of the N number of downlink transmission beams, where N is an integer more than or equal to 1, and less than or equal to K.

In the embodiment of the invention, specifically the reception information is: the information of the downlink reception beam group corresponding to each downlink transmission beam.

Specifically the UE can transmit the identifiers of the N number of downlink transmission beams, and the identifier of the reception beam group corresponding to each downlink transmission beam to the base station. The identifiers of the N number of downlink transmission beams are the same as described in the first embodiment, so a repeated description thereof will be omitted here. For example, UE has S reception beam groups in total, so the identifiers of the reception beam group range from 0 to S.

For example, the UE reports a correspondence relationship between three downlink transmission beams x0, x1, and x2, and their corresponding reception beam groups z0, z1, and z2 as depicted in Table 5 to the base station.

TABLE 5

| Identifier of downlink transmission beam | Identifier of downlink reception beam group |
|---|---|
| $X_0$ | $Z_0$ |
| $X_1$ | $Z_1$ |
| $X_2$ | $Z_2$ |

Alternatively the UE reports the identifier of the reception beam corresponding to each downlink transmission beam to the base station; or the UE reports to the base station the identifiers of downlink transmission beams with received signal power above some threshold, and the identifiers of their corresponding reception beams.

After the step above is performed, the flow of the method according to the embodiment of the invention proceeds to the step 102 in which the UE receives a notification, related to the first downlink transmission beam, transmitted by the base station. The notification includes an indicator for determining at least one first downlink reception beam by the UE.

Specifically after the UE reports the above information to the base station, the base station determines the downlink transmission beam for transmitting a downlink signal to the UE, according to the information reported by the UE, and transmits the notification including the indicator for determining the corresponding reception beam to the base station.

In the embodiment of the invention, the indicator is at least one identifier of at least one group to which at least one first downlink reception beam belongs.

In the embodiment of the invention, the notification further includes a validity time of the notification, or a valid time-frequency resource indicator indicating a time-frequency resource position corresponding to the at least one first downlink reception beam, or a mapping relationship between the at least one first reception beam and time-frequency resource positions in a preset period of time.

Specifically the notification is the same as described in the first embodiment, so a repeated description thereof will be omitted here.

After the step above is performed, the flow of the method according to the embodiment of the invention proceeds to the step 103 in which the UE determines the at least one first downlink reception beam based upon the notification.

In the embodiment of the invention, a specific implementation of the step 103 is as follows.

The UE determines at least one target group based upon the at least one group identifier, and selects a first downlink reception beam from each of the at least one target group as the at least one first downlink reception beam.

In the embodiment of the invention, a first downlink reception beam is selected from each of the at least one target group as follows: the UE selects any one downlink reception beam from each group as the first downlink reception beam; or the UE selects a downlink reception beam matching with a second group information from each group as the first downlink reception beam; or the UE receives R training signals transmitted by the base station using each downlink reception beam in each group, and selects a downlink reception beam satisfying a preset rule from each group as the first downlink reception beam based upon the training signals received using each downlink reception beam.

Specifically upon reception of the notification, the UE needs to select a beam from the target reception beam group, for receiving data and a signal. The beam can be selected as follows.

a) The beam is selected randomly.

b) The beam is selected according to previous measurement results. For example, the UE stores the downlink reception beams corresponding to the previously reported N number of downlink transmission beams, and if one of the downlink reception beams belongs to the target reception beam group, then the UE may select the reception beam for receiving data and a signal.

c) The beam is selected based upon the training signals transmitted by the base station. The base station transmits several training signals, and the UE receives the training signals respectively using each beam in the target reception beam group, and selects the downlink reception beam under some criterion, e.g., the reception beam with the highest power of a received signal.

After the step above is performed, the flow of the method according to the embodiment of the invention proceeds to the step 104 in which the UE receives a downlink signal using the at least one first downlink reception beam.

Specifically after the UE and the base station determine the downlink transmission beam and the downlink reception beam, they can transmit/receive a downlink signal.

Third Embodiment

Figure 3:
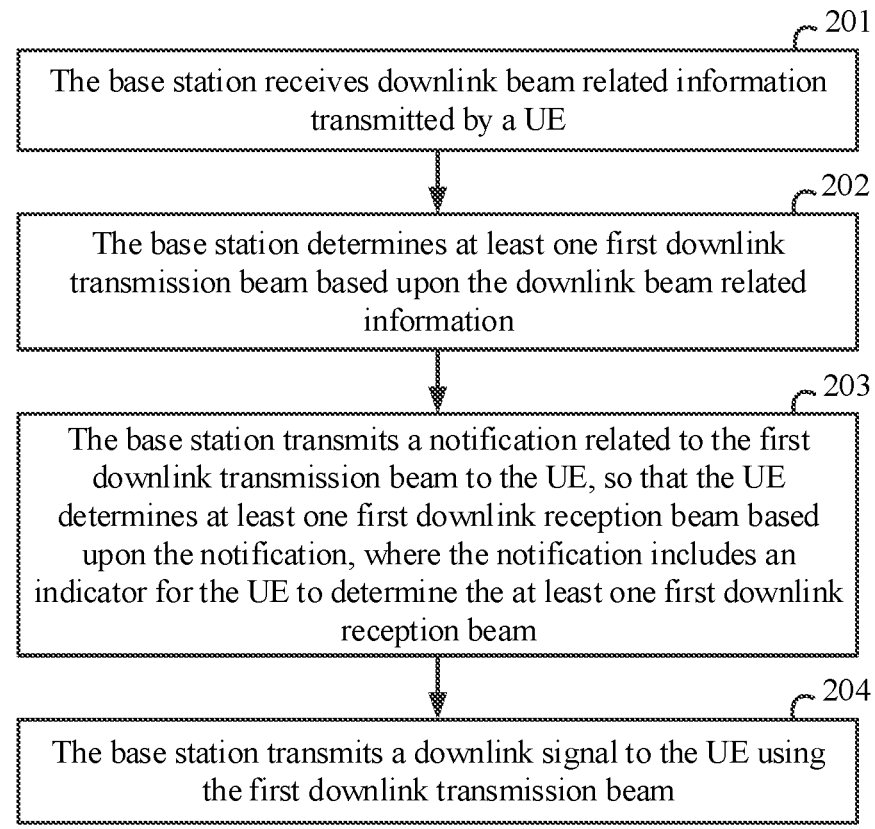
FIG. 3 is a schematic flow chart of managing a beam by a base station according to an embodiment of the invention.

Based upon the same inventive idea, as illustrated in FIG. 3, a base station manages a beam according to an embodiment of the invention specifically as follows.

In the step 201, the base station receives downlink beam related information transmitted by a UE.

In the embodiment of the invention, before the step 201, the method further includes: the base station transmits K number of downlink transmission beam training signals to the UE, where K is an integer more than or equal to 1.

Specifically the base station firstly receives the reception beam related information of the UE reported by the UE, e.g., the number of reception beams of the UE, or the number of reception beam groups of the UE. Then the base station transmits the downlink transmission beam training signals based upon the received reception beam related information of the UE, where the base station transmits the downlink transmission beam training signals in the same way as described in the first embodiment, so a repeated description thereof will be omitted here.

The UE can receive the downlink transmission beam training signals in the following two implementations.

In a first implementation, the UE receives the downlink beam training signals transmitted by the base station using one or more of the M reception beams, and then measures the received beam training signals, and further determine N number of downlink transmission beams satisfying a condition.

In this case, specifically the downlink beam related information is: N first identifiers of the N number of downlink transmission beams satisfying a preset condition among K number of downlink transmission beams of the base station, and reception information corresponding to each of the N number of downlink transmission beams, where N is an integer more than or equal to 1, and less than or equal to K.

In this case, specifically the reception information is: the identifier of the downlink reception beam corresponding to each downlink transmission beam; or a reception indicator corresponding to each downlink transmission beam.

For a specific implementation thereof, reference can be made to the first embodiment, so a repeated description thereof will be omitted here.

In a second implementation, the UE firstly groups its reception beams, then receives the downlink transmission beam training signals transmitted by the base station using one or more of the reception beam groups, and next measures the beam training signals received using each reception beam group, and further determines the N number of downlink transmission beams satisfying the condition.

In this case, specifically the downlink beam related information is: N first identifiers of the N number of downlink transmission beams satisfying a preset condition among K number of downlink transmission beams of the base station, and reception information corresponding to each of the N number of downlink transmission beams, where N is an integer more than or equal to 1, and less than or equal to K.

In this case, specifically the reception information is: the information of the downlink reception beam group corresponding to each downlink transmission beam.

For a specific implementation thereof, reference can be made to the first embodiment, so a repeated description thereof will be omitted here.

After the step above is performed, the flow of the method according to the embodiment of the invention proceeds to the step 202 in which the base station determines at least one first downlink transmission beam based upon the downlink beam related information.

Specifically after the base station receives the information reported by the UE, the base station determines the downlink transmission beam for transmitting a downlink signal to the UE, according to the information reported by the UE. For example, the base station selects one or more of the N number of downlink transmission beams determined by the UE as the first downlink transmission beam or beams, or selects any one downlink transmission beam as the first downlink transmission beam, although the embodiment of the invention will not be limited thereto.

After the step 202 is performed, the flow of the method according to the embodiment of the invention proceeds to the step 203 in which the base station transmits to the UE a notification related to the first downlink transmission beam, so that the UE determines at least one first downlink transmission beam based upon the notification. The notification includes an indicator for the UE to determine the at least one first downlink transmission beam.

In the embodiment of the invention, the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

The notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

Specifically the notification transmitted by the base station varies with varying information reported by the UE. When the information reported by the UE is the identifier of a reception beam corresponding to a downlink transmission beam, the base station transmits an index or an identifier corresponding to the reception beam to the UE; when the information reported by the UE is a beam group identifier of a reception beam group corresponding to a downlink transmission beam, the base station transmits a group identifier corresponding to a reception beam to the UE; and when the information reported by the UE is a reception indicator corresponding to a downlink transmission beam, the base station transmits a reception indicator of a reception beam to the UE. The notification is the same as described in the first embodiment, so a repeated description thereof will be omitted here.

In the embodiment of the invention, there are the following two specific implementations of the step 203.

In a first implementation, after the base station determines the at least one downlink transmission beam for transmitting a downlink signal, the base station transmits the notification related to the downlink transmission beam directly to the UE.

In a second implementation, a specific implementation of the step 203 is as follows.

The base station decides whether to transmit the notification to the UE.

If so, then the base station transmits the notification to the UE.

In the embodiment of the invention, the base station decides whether to transmit the notification to the UE, as follows.

The base station determines whether the current downlink transmission beam is the same as the first downlink transmission beam.

If not, then the base station determines to transmit the notification to the UE.

Specifically when the base station determines the downlink transmission beam for transmitting a downlink signal, the base station decides whether to transmit a beam switching notification to the UE, specifically in the following two implementations.

a) If the downlink transmission beam is not changed, then the notification isn't transmitted.

If the downlink transmission beam is changed, then the base station compares the identifiers of downlink reception beams corresponding to the changed downlink transmission beam and the unchanged downlink transmission beam, and if they are different, then the notification is transmitted.

b) If the downlink transmission beam is not changed, then the notification isn't transmitted.

If the downlink transmission beam is changed, then the base station compares group identifiers of the downlink reception beam group corresponding to the changed downlink transmission beam and the unchanged downlink transmission beam, and if they are different, then the notification is transmitted.

After the step above is performed, the flow of the method according to the embodiment of the invention proceeds to the step 204 in which the base station transmits a downlink signal to the UE using the first downlink transmission beam.

Specifically after the base station and the UE determine the downlink transmission beam and the downlink reception beam, they can transmit/receive a downlink signal.

Fourth Embodiment

Figure 4:
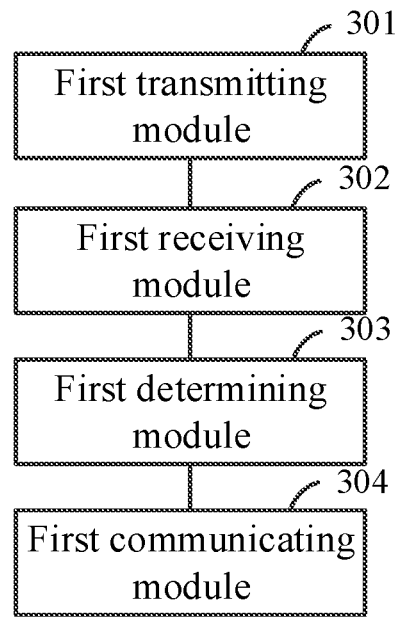
FIG. 4 is a schematic structural diagram of a UE according to an embodiment of the invention.

Based upon the same inventive idea, an embodiment of the invention provides a UE, and reference can be made to the description of the method according to the embodiment of the invention for a particular implementation of the UE, so a repeated description thereof will be omitted here; and as illustrated in FIG. 4, the UE generally includes the followings.

A first transmitting module 301 is configured to transmit downlink beam related information of the UE to a base station, so that the base station determines at least one first downlink transmission beam based upon the downlink beam related information.

A first receiving module 302 is configured to receive a notification related to the first downlink transmission beam, transmitted by the base station, where the notification includes an indicator for the UE to determine at least one first downlink reception beam.

A first determining module 303 is configured to determine the at least one first downlink reception beam based upon the notification.

A first communicating module 304 is configured to receive a downlink signal using the at least one first downlink reception beam.

Optionally the first transmitting module is configured: to receive K number of downlink transmission beam training signals transmitted by the base station using at least one of M number of downlink reception beams; to determine the downlink beam related information of the UE based upon the reception signals received using the at least one downlink reception beam; and to transmit the downlink beam related information to the base station.

Where M and K are integers more than or equal to 1, and K is more than or equal to M.

Optionally the downlink beam related information is: N first identifiers of the N number of downlink transmission beams satisfying a preset condition among K number of downlink transmission beams of the base station, and reception information corresponding to each of the N number of downlink transmission beams, where N is an integer more than or equal to 1, and less than or equal to K.

Optionally the reception information is: the identifier of the downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

Optionally the first determining module is configured: to determine the at least one downlink reception beam based upon the at least one index; or to determine the at least one first downlink reception beam based upon the first reception indicator; or to determine the at least one first downlink reception beam based upon the at least one identifier, and a correspondence relationship between identifiers and downlink reception beams; or to determine at least one second downlink reception beam based upon the at least one index or the at least one identifier; and to determine at least one reception beam matching with the at least one second downlink reception beam among the M number of downlink reception beams as the at least one first downlink reception beam; or to determine at least one target group based upon the at least one group identifier, and to select a first downlink reception beam from each of the at least one target group as the at least one first downlink reception beam.

Optionally the first determining module is configured: to select any one downlink reception beam from each group as the first downlink reception beam; or to select a downlink reception beam matching with a second group information from each group as the first downlink reception beam; or to receive R training signals transmitted by the base station using each downlink reception beam in each group, and to select a downlink reception beam satisfying a preset rule from each group as the first downlink reception beam based upon the reception training signals received using each downlink reception beam.

Fifth Embodiment

Figure 5:
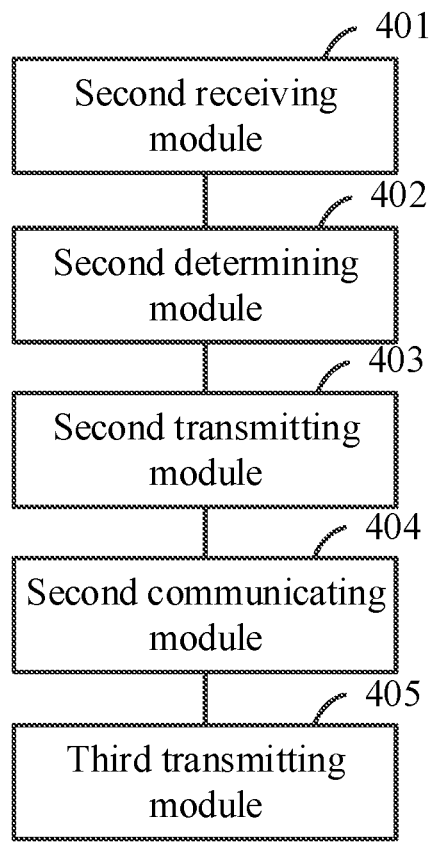
FIG. 5 is a schematic structural diagram of a base station according to an embodiment of the invention.

Based upon the same inventive idea, an embodiment of the invention provides a base station, and reference can be made to the description of the method according to the embodiment of the invention for a particular implementation of the base station, so a repeated description thereof will be omitted here; and as illustrated in FIG. 5, the base station generally includes the followings.

A second receiving module 401 is configured to receive downlink beam related information transmitted by a UE.

A second determining module 402 is configured to determine at least one first downlink transmission beam based upon the downlink beam related information.

A second transmitting module 403 is configured to transmit a notification related to the first downlink transmission beam to the UE, so that the UE determines at least one first downlink reception beam based upon the notification, where the notification includes an indicator for the UE to determine the at least one first downlink reception beam.

A second communicating module 404 is configured to transmit a downlink signal to the UE using the first downlink transmission beam.

Optionally the base station further includes: a third transmitting module 405 configured to transmit K number of downlink transmission beam training signals to the UE, where K is an integer more than or equal to 1.

Optionally the downlink beam related information is: N first identifiers of N number of downlink transmission beams satisfying a preset condition among K number of downlink transmission beams of the base station, and reception information corresponding to each of the N number of downlink transmission beams, where N is an integer more than or equal to 1, and less than or equal to K.

Optionally the reception information is: an identifier of a downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the second transmitting module is configured: to decide whether to transmit the notification to the UE; and if yes, to transmit the notification to the UE.

Optionally the second transmitting module is configured: to determine whether the current downlink transmission beam is the same as the first downlink transmission beam; and if not, to decide to transmit the notification to the UE.

Optionally the notification further includes a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

Sixth Embodiment

Figure 6:
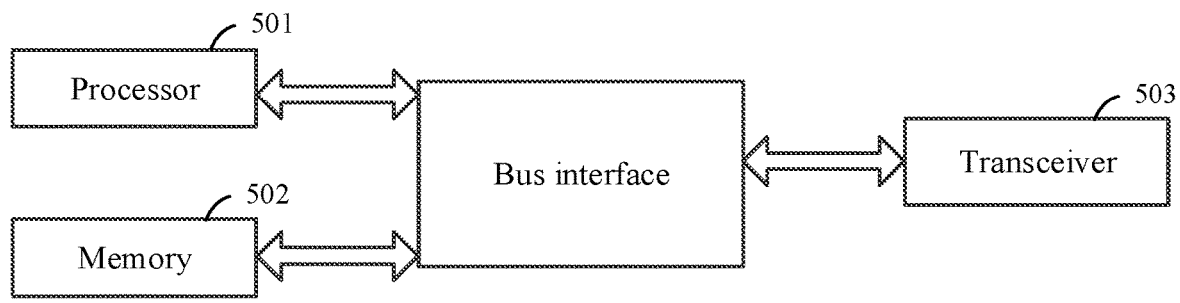
FIG. 6 is a schematic structural diagram of another UE according to an embodiment of the invention.

Based upon the same inventive idea, an embodiment of the invention provides a UE, and reference can be made to the description of the method according to the embodiment of the invention for a specific implementation of the UE, so a repeated description thereof will be omitted here. As illustrated in FIG. 6, the UE generally includes a processor 501, a memory 502, and a transceiver 503, where the transceiver 503 receives and transmits data under the control of the processor 501, the memory 502 stores preset program, and the processor 501 reads and executes the program in the memory 502: to transmit downlink beam related information of the UE to a base station through the transceiver 503, so that the base station determines at least one first downlink transmission beam based upon the downlink beam related information; to receive a notification related to the first downlink transmission beam, transmitted by the base station through the transceiver 503, where the notification includes an indicator for the UE to determine at least one first downlink reception beam; to determine the at least one first downlink reception beam based upon the notification; and to receive a downlink signal using the at least one first downlink reception beam through the transceiver 503.

Optionally the processor is configured: to receive K number of downlink transmission beam training signals transmitted by the base station using at least one of M number of downlink reception beams through the transceiver 503; to determine the downlink beam related information of the UE based upon the reception signals received using the at least one downlink reception beam; and to transmit the downlink beam related information to the base station through the transceiver 503, where M and K are integers more than or equal to 1, and K is more than or equal to M.

Optionally the downlink beam related information is: N first identifiers of N number of downlink transmission beams satisfying a preset condition among K number of downlink transmission beams of the base station, and reception information corresponding to each of the N number of downlink transmission beams, where N is an integer more than or equal to 1, and less than or equal to K.

Optionally the reception information is: an identifier of the downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the notification further includes a validity time of the notification, or a valid time-frequency resource indicator indicating a time-frequency resource position corresponding to the at least one first downlink reception beam, or a mapping relationship between the at least one first reception beam and time-frequency resource position(s) in a preset period of time.

Optionally the processor 501 is configured: to determine the at least one downlink reception beam based upon the at least one index; or to determine the at least one first downlink reception beam based upon the first reception indicator; or to determine the at least one first downlink reception beam based upon the at least one identifier, and a correspondence relationship between identifiers and downlink reception beams; or to determine at least one second downlink reception beam based upon the at least one index or the at least one identifier; and to determine at least one reception beam matching with the at least one second downlink reception beam among the M number of downlink reception beams as the at least one first downlink reception beam; or to determine at least one target group based upon the at least one group identifier, and to select a first downlink reception beam from each of the at least one target group as the at least one first downlink reception beam.

Optionally the processor 501 is configured: to select any one downlink reception beam from each group as the first downlink reception beam; or to select a downlink reception beam matching with a second group information from each group as the first downlink reception beam; or to receive R training signals transmitted by the base station using each downlink reception beam in each group, and to select a downlink reception beam satisfying a preset rule from each group as the first downlink reception beam based upon the reception training signals received using each downlink reception beam.

Seventh Embodiment

Figure 7:
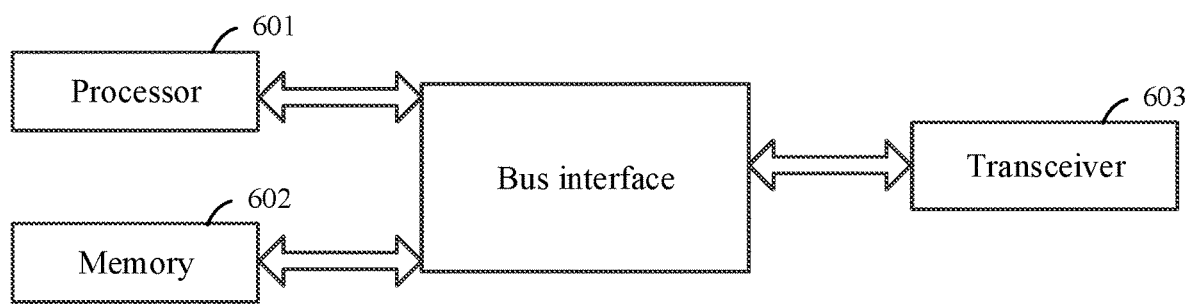
FIG. 7 is a schematic structural diagram of another base station according to an embodiment of the invention.

Based upon the same inventive idea, an embodiment of the invention provides a base station, and reference can be made to the description of the method according to the embodiment of the invention for a specific implementation of the base station, so a repeated description thereof will be omitted here. As illustrated in FIG. 7, the base station generally includes a processor 601, a memory 602, and a transceiver 603, where the transceiver 603 receives and transmits data under the control of the processor 601, the memory 602 stores preset program, and the processor 601 reads and executes the program in the memory 602: to receive downlink beam related information transmitted by a UE through the transceiver 603; to determine at least one first downlink transmission beam based upon the downlink beam related information; to transmit a notification related to the first downlink transmission beam to the UE through the transceiver 603, so that the UE determines at least one first downlink reception beam based upon the notification, where the notification includes an indicator for the UE to determine the at least one first downlink reception beam; and to transmit a downlink signal to the UE using the first downlink transmission beam through the transceiver 603.

Optionally before the processor 601 receives the downlink beam related information transmitted by the UE through the transceiver 603, the processor 601 is configured to transmit K number of downlink transmission beam training signals to the UE through the transceiver 603, where K is an integer more than or equal to 1.

Optionally the downlink beam related information is: N first identifiers of N number of downlink transmission beams satisfying a preset condition among K number of downlink transmission beams of the base station, and reception information corresponding to each of the N number of downlink transmission beams, where N is an integer more than or equal to 1, and less than or equal to K.

Optionally the reception information is: an identifier of a downlink reception beam corresponding to each downlink transmission beam; or information of a downlink reception beam group corresponding to each downlink transmission beam; or a reception indicator corresponding to each downlink transmission beam.

Optionally the indicator is at least one index of the at least one first downlink reception beam, or at least one identifier of the at least one first downlink reception beam, or at least one group identifier of at least one group including the at least one first downlink reception beam, or a first reception indicator corresponding to the first downlink transmission beam.

Optionally the processor 601 is configured to decide whether to transmit the notification to the UE; and if so, to transmit the notification to the UE through the transceiver.

Optionally the processor 601 is configured to determine whether the current downlink transmission beam is the same as the first downlink transmission beam; and if not, to decide to transmit the notification to the UE.

Optionally the notification further includes a validity time of the notification, or a valid time-frequency resource indicator indicating a time-frequency resource position corresponding to the at least one first downlink reception beam, or a mapping relationship between the at least one first reception beam and time-frequency resource position(s) in a preset period of time.

With the technical solutions above, in the embodiments of the invention, the UE transmits the downlink beam related information of the UE to the base station, so that the base station determines at least one first downlink transmission beam based upon the downlink beam related information; the UE receives the notification related to the first downlink transmission beam, transmitted by the base station, where the notification includes the indicator for the UE to determine at least one first downlink reception beam; the UE determines the at least one first downlink reception beam based upon the notification; and the UE receives a downlink signal using the at least one first downlink reception beam, so that the beams are managed and controlled based upon the reception beams of the UE, and the number of reception beams of the UE is less than the number of transmission beams of the base station, so the amount of downlink beam related information transferred between the UE and the base station can also be reduced, to thereby greatly lower an overhead of control signaling so as to address the problem of a considerable overhead of control signaling for managing beams in the existing massive antenna technology.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for managing an antenna beam, the method comprising:
   transmitting, by a User Equipment (UE), downlink beam related information of the UE to a base station, so that the base station determines at least one first downlink transmission beam based upon the downlink beam related information;
   receiving, by the UE, a notification related to the first downlink transmission beam, transmitted by the base station, wherein the notification comprises an indicator for the UE to determine at least one first downlink reception beam;
   determining, by the UE, the at least one first downlink reception beam based upon the notification; and
   receiving, by the UE, a downlink signal using the at least one first downlink reception beam;
   wherein transmitting, by the UE, the downlink beam related information of the UE to the base station comprises:
   receiving, by the UE, K number of downlink transmission beam training signals transmitted by the base station using at least one of M number of downlink reception beams;
   determining, by the UE, the downlink beam related information of the UE based upon reception signals received using the at least one downlink reception beam; and
   transmitting, by the UE, the downlink beam related information to the base station;
   wherein M and K are integers more than or equal to 1, and K is more than or equal to M;
   wherein the downlink beam related information is:
   N number of first identifiers of N number of downlink transmission beams satisfying a preset condition among K number of downlink transmission beams of the base station, and reception information corresponding to each of the N number of downlink transmission beams, wherein N is an integer more than or equal to 1, and less than or equal to K.

2. The method according to claim 1, wherein the reception information is:
   an identifier of a downlink reception beam corresponding to each downlink transmission beam; or
   information of a downlink reception beam group corresponding to each downlink transmission beam; or
   a reception indicator corresponding to each downlink transmission beam.

3. The method according to claim 1, wherein the indicator is at least one index of the at least one first downlink reception beam, or at least one identifier of the at least one first downlink reception beam, or at least one group identifier of at least one group comprising the at least one first downlink reception beam, or a first reception indicator corresponding to the first downlink transmission beam.

4. The method according to claim 3, wherein the notification further comprises a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

5. The method according to claim 3, wherein determining, by the UE, the at least one first downlink reception beam based upon the notification comprises:
   determining the at least one first downlink reception beam based upon the at least one index; or
   determining the at least one first downlink reception beam based upon the first reception indicator; or
   determining the at least one first downlink reception beam based upon the at least one identifier, and a correspondence relationship between identifiers and downlink reception beams; or
   determining at least one second downlink reception beam based upon the at least one index or the at least one identifier; and determining at least one reception beam, matching with the at least one second downlink reception beam, among the M number of downlink reception beams as the at least one first downlink reception beam; or determining at least one target group based upon the at least one group identifier, and selecting a first downlink reception beam from each of the at least one target group as the at least one first downlink reception beam.

6. The method according to claim 5, wherein selecting a first downlink reception beam from each of the at least one target group comprises:
   selecting, by the UE, any one downlink reception beam from each group as the first downlink reception beam; or
   selecting, by the UE, a downlink reception beam matching with a second group information from each group as the first downlink reception beam; or
   receiving, by the UE, R number of training signals transmitted by the base station using each downlink reception beam in each group, and selecting, by the UE, a downlink reception beam satisfying a preset rule from each group as the first downlink reception beam based upon reception training signals received using each downlink reception beam.

7. A method for managing an antenna beam, comprising:
   receiving, by a base station, downlink beam related information transmitted by a User Equipment (UE);
   determining, by the base station, at least one first downlink transmission beam based upon the downlink beam related information;
   transmitting, by the base station, a notification related to the first downlink transmission beam to the UE, so that the UE determines at least one first downlink reception beam based upon the notification, wherein the notification comprises an indicator for the UE to determine the at least one first downlink reception beam; and
   transmitting, by the base station, a downlink signal to the UE using the first downlink transmission beam;
   wherein before the base station receives the downlink beam related information transmitted by the UE, the method further comprises:
   transmitting, by the base station, K number of downlink transmission beam training signals to the UE, wherein K is an integer more than or equal to 1;
   wherein the downlink beam related information is:
   N number of first identifiers of N number of downlink transmission beams satisfying a preset condition among K number of downlink transmission beams of the base station, and reception information corresponding to each of the N number of downlink transmission beams, wherein N is an integer more than or equal to 1, and less than or equal to K.

8. The method according to claim 7, wherein the reception information is:
   an identifier of a downlink reception beam corresponding to each downlink transmission beam; or
   information of a downlink reception beam group corresponding to each downlink transmission beam; or
   a reception indicator corresponding to each downlink transmission beam.

9. The method according to claim 7, wherein the indicator is at least one index of the at least one first downlink reception beam, or at least one identifier of the at least one first downlink reception beam, or at least one group identifier of at least one group comprising the at least one first downlink reception beam, or a first reception indicator corresponding to the first downlink transmission beam.

10. The method according to claim 9, wherein transmitting, by the base station, the notification related to the first downlink transmission beam to the UE comprises:
    deciding, by the base station, whether to transmit the notification to the UE; and
    if the base station decides to transmit the notification to the UE, transmitting the notification to the UE.

11. The method according to claim 10, wherein deciding, by the base station, whether to transmit the notification to the UE comprises:
    determining, by the base station, whether a current downlink transmission beam is the same as the first downlink transmission beam; and
    if the current downlink transmission beam is determined not to be the same as the first downlink transmission beam, then deciding to transmit the notification to the UE.

12. The method according to claim 9, wherein the notification further comprises a validity time of the notification, or a valid time-frequency resource indicator indicating a time-frequency resource position corresponding to the at least one first downlink reception beam, or a mapping relationship between the at least one first reception beam and a time-frequency resource position in a preset period of time.

13. A User Equipment (UE), comprising a processor, a memory, and a transceiver, wherein the transceiver receives and transmits data under a control of the processor, the memory stores preset program, and the processor reads and executes the program in the memory:
    to transmit downlink beam related information of the UE to a base station, so that the base station determines at least one first downlink transmission beam based upon the downlink beam related information;
    to receive a notification related to the first downlink transmission beam, transmitted by the base station;
    to determine at least one first downlink reception beam based upon the notification; and
    to receive a downlink signal using the at least one first downlink reception beam;
    wherein the notification comprises an indicator for the UE to determine the at least one first downlink reception beam;
    wherein the processor is configured:
    to receive K number of downlink transmission beam training signals transmitted by the base station using at least one of M number of downlink reception beams;
    to determine the downlink beam related information of the UE based upon reception signals received using the at least one downlink reception beam; and
    to transmit the downlink beam related information to the base station,
    wherein M and K are integers more than or equal to k and K is more than or equal to M;
    wherein the downlink beam related information is:
    N number of first identifiers of N number of downlink transmission beams satisfying a preset condition among K number of downlink transmission beams of the base station, and reception information corresponding to each of the N number of downlink transmission beams, wherein N is an integer more than or equal to 1, and less than or equal to K.

14. The UE according to claim 13, wherein the reception information is:
- an identifier of a downlink reception beam corresponding to each downlink transmission beam; or
- information of a downlink reception beam group corresponding to each downlink transmission beam; or
- a reception indicator corresponding to each downlink transmission beam.

* * * * *